US012344778B2

(12) United States Patent
Matsumura et al.

(10) Patent No.: US 12,344,778 B2
(45) Date of Patent: *Jul. 1, 2025

(54) POLYESTER FILM AND USE THEREOF

(71) Applicant: TOYOBO CO., LTD., Osaka (JP)

(72) Inventors: Mei Matsumura, Tsuruga (JP); Shotaro Nishio, Tsuruga (JP); Kiwamu Kawai, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 400 days.

This patent is subject to a terminal disclaimer.

(21) Appl. No.: 17/905,952

(22) PCT Filed: Mar. 2, 2021

(86) PCT No.: PCT/JP2021/007989
§ 371 (c)(1),
(2) Date: Sep. 9, 2022

(87) PCT Pub. No.: WO2021/182191
PCT Pub. Date: Sep. 16, 2021

(65) Prior Publication Data
US 2023/0122628 A1 Apr. 20, 2023

(30) Foreign Application Priority Data

Mar. 9, 2020 (JP) ................................. 2020-039746

(51) Int. Cl.
| C09J 7/29 | (2018.01) |
| C09J 7/25 | (2018.01) |
| C09J 7/38 | (2018.01) |
| G02B 1/14 | (2015.01) |
| H04M 1/02 | (2006.01) |

(52) U.S. Cl.
CPC ................. *C09J 7/255* (2018.01); *C09J 7/29* (2018.01); *C09J 7/38* (2018.01); *G02B 1/14* (2015.01); *H04M 1/0268* (2013.01); *C09J 2203/326* (2013.01); *C09J 2467/006* (2013.01); *C09J 2475/00* (2013.01); *H04M 1/0216* (2013.01)

(58) Field of Classification Search
None
See application file for complete search history.

(56) References Cited

U.S. PATENT DOCUMENTS

| 2015/0119548 A1 | 4/2015 | Takahashi et al. |
| 2019/0315107 A1 | 10/2019 | Ishimaru et al. |
| 2021/0064164 A1 | 3/2021 | Inou et al. |
| 2021/0179794 A1* | 6/2021 | Yoshino ................... G02B 1/14 |
| 2022/0115475 A1 | 4/2022 | Gunji et al. |
| 2023/0192974 A1 | 6/2023 | Nishio et al. |

FOREIGN PATENT DOCUMENTS

| CN | 107267079 A | 10/2017 |
| EP | 2679378 A1 | 1/2014 |
| JP | 2003-113258 A | 4/2003 |
| JP | 2007-138183 A | 6/2007 |
| JP | 2010-228391 A | 10/2010 |
| JP | 2014-065887 A | 4/2014 |
| JP | 2014-156579 A | 8/2014 |
| JP | 2016-141058 A | 8/2016 |
| JP | 2016-155124 A | 9/2016 |
| JP | 2018-070780 A | 5/2018 |
| JP | 2018-072663 A | 5/2018 |
| JP | 2018-124367 A | 8/2018 |
| JP | 2019-127035 A | 8/2019 |
| JP | 2020-012087 A | 1/2020 |
| WO | WO 2014/157109 A1 | 10/2014 |
| WO | WO 2016/002488 A1 | 1/2016 |
| WO | 2018/150940 A1 | 8/2018 |
| WO | WO 2018/159285 A1 | 9/2018 |
| WO | WO 2019/082834 A1 | 5/2019 |
| WO | WO 2019/131679 A1 | 7/2019 |
| WO | WO 2019/202992 A1 | 10/2019 |
| WO | WO 2020/066020 A1 | 4/2020 |
| WO | WO 2021/215349 A1 | 10/2021 |

OTHER PUBLICATIONS

Japan Patent Office, International Search Report in International Patent Application No. PCT/JP2021/007989 (May 25, 2021).
Japan Patent Office, Office Action in Japanese Patent Application No. 2022-505945 (Jan. 9, 2024).
Japan Patent Office, Office Action in Japanese Patent Application in 2022-505945 (Jun. 18, 2024).
European Patent Office, Extended European Search Report in European Patent Application No. 21766848.2 (Mar. 12, 2024).
Japan Patent Office, Office Action in Japanese Patent Application No. 2022-505945 (Jan. 28, 2025).
European Patent Office, Extended European Search Report in European Patent Application No. 21792464.6 (Apr. 19, 2024).
Japan Patent Office, International Search Report in International Patent Application No. PCT/JP2021/015609 (Jun. 22, 2021).

* cited by examiner

*Primary Examiner* — Sheeba Ahmed
(74) *Attorney, Agent, or Firm* — Leydig, Voit & Mayer, Ltd.

(57) ABSTRACT

Problem: An object of the present invention is to provide a polyester film for a foldable display, the film having a hold angle in a bending direction of 155° or more and a maximum heat shrinkage at 150° C. of 1.5% or less (wherein the hold angle refers to an angle of a crease after fixing the film at room temperature for 72 hours in such a manner that a strain of 1.7% is applied to both surfaces of a bent portion of the film, and the bending direction refers to a direction that is orthogonal to a folding portion of a foldable display produced using the film.

10 Claims, 2 Drawing Sheets

POLYESTER FILM AND USE THEREOF

TECHNICAL FIELD

The present invention relates to polyester films for foldable displays, hard coating films for foldable displays, foldable displays, and mobile devices. The present invention further relates to foldable displays and mobile devices that are less likely to have image distortion caused by deformation of the film, even when the display is repeatedly folded, and to polyester films and hard coating films for such foldable displays.

BACKGROUND ART

Becoming thinner and lighter, mobile devices such as smart phones have become widely prevalent. While being required to have a variety of functions, mobile devices are also required to be convenient to use. It is taken for granted that prevailing mobile devices can be operated with one hand for simple tasks, and can be put into a clothes pocket. Thus, such mobile devices must have a small screen size, such as about 6 inches.

Tablet devices with a screen size of 7 to 10 inches are intended for use not only for video content and music, but also for business purposes, drawing, and reading, and thus have a high level of functionality. However, these devices cannot be operated with one hand and are inferior in terms of portability, leaving some issues in regards to convenience.

In order to meet the above requirements, a technique of making compact devices by connecting multiple displays is suggested. However, due to the remaining bezel portion, the image is split, and visibility decreases. Thus, this technique is not commonly used.

More recently, mobile devices equipped with a flexible or foldable display have been proposed. This technique enables conveniently carrying a mobile device equipped with a large screen display without problems of image splitting.

Conventional displays and mobile devices that have no folding structure can be protected by a non-flexible material, such as glass, that is applied to the surface of the display. However, a foldable display that uses a single screen spanning over a folding portion must be protected by, for example, a flexible and surface-protecting hard coating film. However, a foldable display is repeatedly folded at the point where a portion folds, and the film at that point deforms over time, causing image distortion on the display. In addition to the surface protection film, films are further used in various parts of a foldable display, such as a polarizing plate, a retardation film, a touchscreen substrate, a substrate of display cells such as organic EL, and protective materials on the back. These films are also required to be durable against repeated folding.

For example, PTL 1 suggests a technique of partially altering the film thickness. However, this method is not suitable for mass production.

A technique to adjust the refractive index of a polyester film in the bending direction is also suggested. However, the pencil hardness during the application of hard coating decreases with a decrease in the refractive index in the bending direction, thus lowering the surface protection functionality of the display. Additionally, while decreasing the refractive index in one direction reduces deformation that occurs when the display is folded, it makes the folding direction more uniaxially oriented, forming cracks or breaking the display at the folding portion. Breaking does not occur in biaxially oriented films, and biaxially oriented films can be produced with a high yield; however, biaxially oriented films are prone to deformation during folding and have inferior resistance to bending.

CITATION LIST

Patent Literature

PTL 1: JP2016-155124A

SUMMARY OF INVENTION

Technical Problem

The present invention is intended to solve the problems that arise in conventional parts of displays as described above. The invention is intended to provide a polyester film for foldable displays that does not form creases or cracks in the folding portion of a foldable display produced using the film, in order to provide a foldable display that is suitable for mass production and that is unlikely to have distortion of images on the folding portion after the display is folded, and to provide a mobile device equipped with such a foldable display.

Specifically, the present invention includes the following subject matter.

Item 1. A polyester film for a foldable display, the film having a hold angle in a bending direction of 155° or more and a maximum heat shrinkage at 150° C. of 1.5% or less (wherein the hold angle refers to an angle of a crease formed after fixing the film at room temperature for 72 hours in such a manner that a strain of 1.7% is applied to both surfaces of a bent portion of the film, and the bending direction refers to a direction that is orthogonal to a folding portion of a foldable display produced using the film).

Item 2. The polyester film for a foldable display according to Item 1, having a total light transmittance of 85% or more and a haze of 3% or less.

Item 3. The polyester film for a foldable display according to Item 1 or 2, comprising an easy-to-adhere layer on at least one surface of the polyester film.

Item 4. A hard coating film for a foldable display, comprising the polyester film for a foldable display of any one of Items 1 to 3, and a hard coating layer having a thickness of 1 to 50 μm on at least one surface of the polyester film.

Item 5. A foldable display comprising the hard coating film for a foldable display of Item 4,
wherein
the hard coating film is disposed as a surface protection film such that the hard coating layer becomes the front surface, and
the hard coating film is a single continuous film placed through the folding portion of the foldable display.

Item 6. A mobile device comprising the foldable display of Item 5.

Advantageous Effects of Invention

While a foldable display produced using the polyester film or the hard coating film for foldable displays according to the present invention maintains its suitability in mass production, the polyester film of the foldable display does not have cracks at the folding portion, deformation after being folded, or image distortion at the folding portion of the display. A mobile device equipped with the above foldable display produced using a polyester film or hard coating film provides beautiful images and has a variety of functions, while being highly convenient, such as in portability.

DESCRIPTION OF EMBODIMENTS

Display

Figure 1:
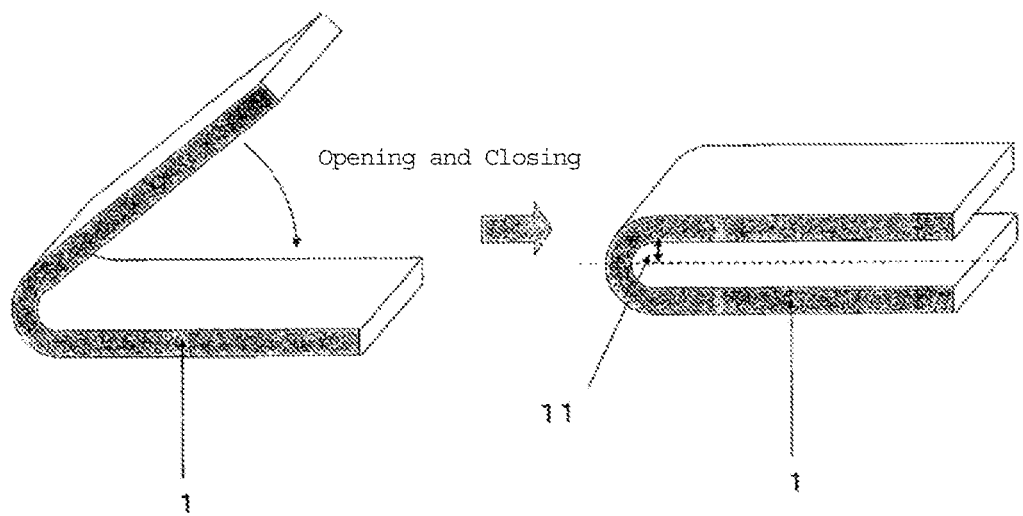
FIG. 1 is a schematic diagram showing the bend radius of the foldable display according to the present invention being folded.

The term "display" as used in the present invention refers to display devices in general. There are several types of displays, such as LCDs, organic EL displays, inorganic EL displays, LEDs, and FEDs; however, LCDs, organic ELs, and inorganic ELs, which have a foldable structure, are preferable. In particular, organic EL displays and inorganic EL displays, which can reduce the layer structure, are preferable; and organic EL displays, which have a wide color gamut, are even more preferable.

Foldable Display

A foldable display is a single continuous display that can be folded in half or other ways when carried. The size of the fordable display can be reduced by half or even more by folding it, and thus the portability is improved. The foldable display preferably has a bend radius of 5 mm or less, and more preferably 3 mm or less. A bend radius of 5 mm or less enables the foldable display to be thin when folded. A smaller bend radius is better; however, the smaller the bend radius, the more easily creases form. The bend radius is preferably 0.1 mm or more, or can be even 0.5 mm or more or 1 mm or more. Even a bend radius of 1 mm or more can achieve a reduction in thickness sufficient for practical use in carrying the display. The bend radius of a folded display refers to a value measured at the point indicated by numerical reference 11 in the schematic diagram of FIG. 1, and is the inner radius of the folding portion of the display being folded. The surface protection film, described later, may be positioned on the outer side or inner side of the foldable display. The foldable display may be a three-fold or four-fold display, or a rollable display, which is a retractable display. All of these displays fall within the scope of the foldable display according to the present invention.

The polyester film for a foldable display according to the present invention may be used in any part of the components of a foldable display. The following describes a typical structure of a foldable display and the parts in which the polyester film according to the present invention is usable, taking an organic EL display as an example. The polyester film for a foldable display according to the present invention may be simply referred to below as "the polyester film according to the present invention."

Foldable Organic EL Display

The essential component of a foldable organic EL display is an organic EL module. A foldable organic EL display may further optionally include, for example, a circularly polarizing plate, a touchscreen module, a surface protection film, and a back protection film.

Organic EL Module

A typical structure of an organic EL module includes an electrode, an electron transport layer, a light-emitting layer, a hole transport layer, and a transparent electrode. The polyester film according to the present invention can be used as a substrate on which an electrode is provided, and further an electron transport layer, a light-emitting layer, and a hole transport layer are provided. In particular, the polyester film according to the present invention can be preferably used as a substrate for a transparent electrode. In this case, because the substrate film is required to have a high level of barrier properties against water vapor or oxygen, the polyester film according to the present invention is preferably provided with a barrier layer such as a metal oxide layer. To enhance the barrier properties, multiple barrier layers may be provided, or multiple polyester films provided with a barrier layer may be used.

Touch Panel Module

The mobile device preferably includes a touchscreen. An organic EL display for use preferably includes a touchscreen module on the organic EL display or between the organic EL module and the circularly polarizing plate. The touchscreen module includes a transparent substrate such as a film and a transparent electrode provided on the transparent substrate. The polyester film according to the present invention can be used as this transparent substrate. The polyester film used as a transparent substrate of a touchscreen is preferably provided with a hard coating layer or a refractive index adjustment layer.

Circularly Polarizing Plate

The circularly polarizing plate suppresses the deterioration of image quality due to the reflection of external light by the components inside the display. A circularly polarizing plate includes a linear polarization plate and a retardation film. The linear polarization plate includes a protection film at least on the visible side of the polarizer. A protection film may be provided on the side opposite the visible side of the polarizer, and a retardation film may be directly stacked on the polarizer. The retardation film for use is a resin film with a phase difference such as polycarbonate or cyclic-olefin, or a resin film provided with a retardation layer composed of a liquid crystal compound. The polyester film according to the present invention can be used as a polarizer protection film or a resin film for a retardation film. In these cases, the slow axis direction of the polyester film according to the present invention is preferably parallel or orthogonal to the absorption axis direction of the polarizer. A deviation of up to 10 degrees, preferably 5 degrees, from this parallel or orthogonal relationship is permissible.

Surface Protection Film

Because a shock applied to a display from above may break the circuitry of an organic EL module or a touchscreen module, a surface protection film is provided in most cases. The polyester film according to the present invention can be used as the surface protection film. The surface protection film includes a "cover window," which is incorporated into the top surface of the display, and an "after film," which can be attached, peeled off, and replaced with another by the user. The polyester film according to the present invention is usable in either case. The polyester film according to the present invention used as a surface protection film preferably has a hard coating layer stacked on at least the front surface of the polyester film. The polyester film is provided on the front surface of a foldable display with the hard coating layer on the viewing side. The hard coating layer may be provided on both surfaces of the polyester film.

Back Protection Film

A protection film is preferably provided also on the back of the display. The polyester film according to the present invention can be used as the protection film for the back.

The polyester film according to the present invention can be any film that is usable in the components of a foldable display at the folded portion, in addition to those described above. Among these, the polyester film according to the present invention is preferably used in cover window surface protection films, after-surface protection films, substrate films for touchscreen modules, or back protection films. The polyester film according to the present invention is more preferably used in cover window surface protection films, or after-surface protection films.

In a foldable display, the polyester film according to the present invention does not have to be used in all of the films described above. In a foldable display, films such as a polyimide film, a polyamide film, a polyamide-imide film, a polyester film that is not the polyester film according to the present invention, a polycarbonate film, an acrylic film, a triacetyl cellulose film, a cyclo-olefin polymer film, a polyphenylene sulfide film, and a polymethylpentene film are also usable according to suitability, in addition to the polyester film according to the present invention.

The polyester film according to the present invention may be a monolayered film composed of one or more types of polyester resins. If two or more types of polyester are used, the polyester film may be a multilayered film or ultra-multilayered lamination film with a repeating structure.

Examples of polyester resins for use in the polyester film include polyethylene terephthalate, polybutylene terephthalate, polyethylene-2,6-naphthalate, and polyester films composed of copolymers that contain the component of these resins as the main component. In particular, from the standpoint of mechanical properties, heat resistance, transparency, and price, drawn polyethylene terephthalate films are particularly preferable.

When a polyester copolymer is used in a polyester film, the dicarboxylic acid component of the polyester can be, for example, aliphatic dicarboxylic acids, such as adipic acid and sebacic acid; aromatic dicarboxylic acids, such as terephthalic acid, isophthalic acid, phthalic acid, and 2,6-naphthalene dicarboxylic acid; or multifunctional carboxylic acids, such as trimellitic acid and pyromellitic acid. The glycol component can be, for example, fatty acid glycols, such as ethylene glycol, diethylene glycol, 1,4-butanediol, propylene glycol, and neopentyl glycol; aromatic glycols, such as p-xylene glycol; alicyclic glycols, such as 1,4-cyclohexanedimethanol; or polyethylene glycols with an average molecular weight of 150 to 20,000. The mass ratio of the copolymer component of the copolymer is preferably less than 20 mass %. A mass ratio of less than 20 mass % is preferable because film strength, transparency, and heat resistance are retained.

In the production of a polyester film, at least one type of resin pellet preferably has an intrinsic viscosity of 0.50 to 1.0 dl/g. An intrinsic viscosity of 0.50 dl/g or more is preferable because such an intrinsic viscosity increases the shock resistance of the obtained film, and thus makes it unlikely for the internal circuitry of the display to be broken by an external shock. An intrinsic viscosity of 1.00 dl/g or less is preferable because it prevents filtration pressure of the molten fluid from becoming too high, thus making it easier to stably perform film production.

The polyester film preferably has a thickness of 10 to 80 µm, and more preferably 25 to 75 µm. A thickness of 10 µm or more provides a pencil hardness improvement effect and an impact resistance improvement effect, and a thickness of 80 µm or less is advantageous in weight reduction and provides excellent flexibility, processability, and handleability.

The surface of the polyester film according to the present invention may be smooth or uneven. However, a decreased level of optical properties due to unevenness is not preferable because the film is used for covering the surface of a display. The haze is preferably 3% or less, more preferably 2% or less, and most preferably 1% or less. A haze of 3% or less can improve the visibility of images. Although a lower haze is better, the lower limit of haze may be preferably 0.1% or more, or 0.3% or more, from the standpoint of stable production.

Given the purposes of reducing haze as described above, the surface should not be too uneven. However, to provide the film with moderate slipperiness for handleability, unevenness may be formed on the film surface by adding particles to the polyester resin layer of the surface layer, or by applying a particle-containing coating layer to the polyester resin layer during the film-forming process.

The method for adding particles to a polyester resin layer can be a known method. For example, particles can be added at any stage of polyester production and can be preferably added in the form of slurry prepared by dispersing the particles in, for example, ethylene glycol, in the esterification stage, after the completion of transesterification, or before the start of polycondensation to facilitate polycondensation. Alternatively, particles can be added by a method of blending slurry prepared by dispersing particles in ethylene glycol or water with a polyester material by using a kneading extruder equipped with a vent, or a method of blending dry particles with a polyester material by using a kneading extruder.

In particular, preferable is a method of homogeneously dispersing the aggregates of inorganic particles in a monomer solution, which is part of a polyester material, then filtering the dispersion, and adding the filtrate to the remainder of the polyester material before, during, or after esterification. Due to the low viscosity of the monomer solution, this method enables homogeneous dispersion of particles and high-precision filtration of the slurry in a simple manner while ensuring excellent particle dispersibility and low likelihood of the occurrence of new aggregates when particles are added to the remainder of the polyester material. From this viewpoint, it is particularly preferable to add particles to the remainder of the polyester material at a low temperature before esterification.

Additionally, the number of protrusions on the surface of the film can be further reduced by a method of preparing a particle-containing polyester beforehand, and kneading the particle-containing polyester pellets with particle-free pellets to extrude pellets (master batch method).

The polyester film may contain various additives within the range in which the desired total light transmission is maintained. Examples of additives include an antistatic agent, a UV absorber, and a stabilizer.

The polyester film has a total light transmittance of preferably 85% or more, and more preferably 87% or more. A transmittance of 85% or more sufficiently ensures visibility. Although a higher total light transmittance of the polyester film is better, the total light transmittance is preferably 99% or less, or may be 97% or less, from the standpoint of stable production.

The surface of the polyester film according to the present invention can be subjected to treatment for improving adhesion with a resin for forming, for example, a hard coating layer.

Examples of surface treatment methods include unevenness-forming treatment by sandblasting, solvent treatment, etc.; and oxidation treatment such as corona discharge, electron beam irradiation, plasma treatment, ozone-UV irradiation, flame treatment, chromic-acid treatment, and hot-air treatment. These methods can be used without any restriction.

Adhesion can also be improved by an adhesion-improving layer, such as an easy-to-adhere layer. For the easy-to-adhere layer, resins such as acrylic resins, polyester resins, polyurethane resins, and polyether resins can be used without any restriction. The easy-to-adhere layer can be formed by a typical coating technique, preferably an "in-line coating technique."

The polyester film described above can be produced, for example, by performing a polymerization step of homogenously dispersing inorganic particles in a monomer solution, which is part of a polyester material, filtering the dispersion, and adding the filtrate to the remainder of the polyester material to polymerize a polyester; and a film-forming step of melting and extruding the polyester into a sheet form through a filter, and cooling and drawing the sheet to form a substrate film.

Below, the method for producing a biaxially oriented polyester film is described with an example in which pellets of polyethylene terephthalate ("PET" below) are used as a material of a substrate film. However, the method is not limited to this example. Additionally, the example is not intended to limit the number of layers, such as a monolayer or a multilayer.

After a predetermined proportion of PET pellets is mixed and dried, the mixture is fed into a known extruder for melting and laminating, and then extruded from the slit die into a sheet form, followed by cooling and solidifying the sheet on a casting roll to form an unstretched film. A monolayer can be produced with a single extruder. A multilayered film (i.e., including two or more layers) can be produced by laminating multiple film layers that each constitute an outermost layer using two or more extruders, a multilayered manifold, or a confluence block (e.g., confluence blocks with a square joint), extruding a sheet of two or more layers from the outlet, and cooling the sheet on a casting roll to prepare an unstretched film.

In this case, it is preferable to perform high-precision filtration to remove foreign matter that may be present in the resin at any portion of the extruder at which the molten resin is maintained at about 280° C. during melt-extrusion. The filter material for use in high-precision filtration of a molten resin can be any material; however, a filter material made of sintered stainless steel is preferable because it is excellent in removing aggregates composed mainly of Si, Ti, Sb, Ge, or Cu and organic matter with a high melting point.

Additionally, the filter material has a filtered particle size (initial filtration efficiency: 95%) of preferably 20 μm or less, particularly preferably 15 μm or less. A filtered particle size (initial filtration efficiency: 95%) exceeding 20 μm may lead to insufficient removal of foreign matter with a size of 20 μm or more. Although high-precision filtration of molten resin using a filter material with a filtered particle size of 20 μm or less (initial filtration efficiency: 95%) may reduce productivity, such a filter material is preferable from the standpoint of obtaining a film that has fewer protrusions caused by coarse particles.

Maximum Heat Shrinkage

In the present invention, the maximum heat shrinkage of the polyester film after heat treatment at 150° C. for 30 minutes is preferably 1.5% or less, more preferably 1.3% or less, even more preferably 1.0% or less, and particularly preferably 0.5% or less. A maximum heat shrinkage of 1.5% or less can reduce flatness errors, such as curling or undulation, during hard coating. While a lower heat shrinkage is considered to be better, the heat shrinkage is preferably −1.0% or more, and more preferably 0% or more. A negative heat shrinkage value means that the film expanded after heating. A value below −1.0% may lead to flatness errors. The maximum heat shrinkage can be effectively adjusted by adjusting the draw ratio or using off-line annealing treatment or aging treatment.

Hold Angle

Figure 2:
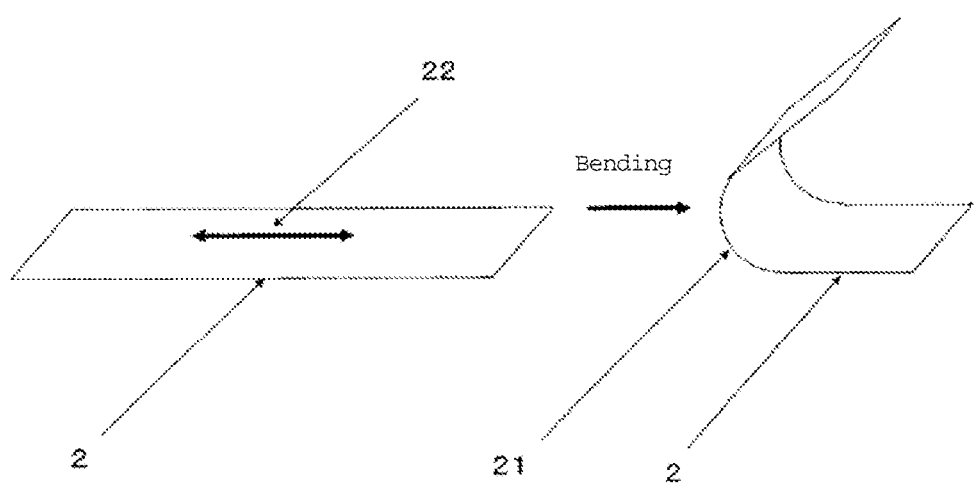
FIG. 2 is a schematic diagram showing the bending direction of the polyester film for a foldable display according to the present invention.

In the present invention, the hold angle in the bending direction is preferably 155° or more, more preferably 158° or more, and even more preferably 160° or more. The hold angle refers to an angle of a crease formed after fixing the film at room temperature for 72 hours in such a manner that a strain of 1.7%, as determined by the calculation described below, is applied to both surfaces of a bent portion of the film. In the present invention, the "bending direction" refers to a direction orthogonal to the folding portion (reference numeral 21) of a foldable display where the foldable display formed using the film is assumed to be folded, as indicated by reference numeral 22 on the polyester film (reference numeral 2) shown in FIG. 2. If the hold angle is less than 155°, deformation of the film may occur when the display is opened after use in a folded state, which may adversely affect the functions of the display, such as reducing the visibility of the display. If the hold angle is 155° or more, good visibility can be maintained with less deformation. The hold angle can be effectively adjusted by adjusting the draw ratio and the draw temperature and thereby controlling the refractive index. In order to increase the hold angle, a step of relaxation in the draw direction, off-line annealing treatment, or aging treatment may be used. The hold angle in the bending direction is most preferably at 180°, may be 175° or less, or may be 170° or less.

Off-Line Annealing Treatment

In the present invention, in order to increase the hold angle and also reduce the maximum heat shrinkage, after the produced film is wound in a roll, the produced film can be subjected to off-line annealing treatment. The annealing treatment temperature is 150° C. or more and 200° C. or less, and more preferably 170° C. or more and 190° C. or less. The time of applying the temperature is preferably 3 seconds or more and 90 seconds or less, and more preferably 5 seconds or more and 60 seconds or less. By setting the temperature and time within the temperature and time ranges described above, the desired annealing can be achieved and a good film having transparency maintained can be obtained.

Off-Line Aging Treatment

In the present invention, in order to increase the hold angle and also reduce the maximum heat shrinkage, after the film is wound in a roll, the produced film can be subjected to off-line aging treatment. The aging treatment temperature is preferably 50° C. or more and 70° C. or less, and more preferably 55° C. or more and 65° C. or less. The treatment time is preferably 72 hours or longer, and more preferably 120 hours or longer. It is thought that the off-line aging treatment does not accelerate crystallization but causes conformational changes in the amorphous portion, thus resulting in densification. Since elongation of the amorphous portion may be considered to be caused by fatigue due to the tensile stress applied to the outside during folding, densification may be expected to reduce tensile fatigue. Although there is no upper limit on the aging time, an excessively long time may make the production difficult. Accordingly, the aging time is preferably 1 month or less, and can be 480 hours or less or can be 360 hours or less.

In the present invention, the drawing ratio of the unstretched polyester sheet is not particularly limited but is preferably 1.2-fold to 6.0-fold.

In the present invention, the draw ratio of the unstretched polyester sheet either in the longitudinal direction (machine direction) or in the width direction is preferably 1.2-fold to 2.0-fold, and more preferably 1.7-fold to 2.0-fold. By reducing the draw ratio in the bending direction, the stress applied to the folding portion during folding can be reduced, and the hold angle in the bending direction can be increased by suppressing compression and tensile fatigue.

The draw ratio in the direction orthogonal to the bending direction is preferably 4.2-fold or less, and more preferably 4.0-fold or less. By reducing the draw ratio in the direction orthogonal to the bending direction, a maximum heat shrinkage of 1.5% or less can be achieved.

When 1.2-fold to 2.0-fold drawing in the bending direction is performed, the drawing temperature is preferably 75 to 120° C., and more preferably 75 to 105° C. The heating method for use during drawing can be a known technique, such as a hot-air heating method, a roll heating method, or an infrared heating method. By setting the draw temperature to the range of 75 to 120° C., drawing at a draw ratio within the range described above is prevented from causing great unevenness in film thickness.

The drawing preheating temperature in the direction orthogonal to the bending direction is preferably 70 to 110° C. In performing multi-stage drawing in the direction orthogonal to the bending direction, it is preferable to set the draw ratio in the second and subsequent states higher than the draw ratio in the first stage. Film relaxation may be performed by 1 to 10% either in the machine direction (longitudinal direction) or in the vertical direction (width direction), or both.

Density of Polyester Film

The density of the polyester film is preferably 1.380 g/cm$^3$ or more, and more preferably 1.383 g/cm$^3$. A density of 1.380 g/cm$^3$ or more can increase flexibility and can increase the hardness of film surface, in particular the pencil hardness of a hard coating film formed by laminating a hard coating layer on the polyester film. A higher density is better. Although it somewhat depends on, for example, whether particles are present in the film, the density of the polyester film is preferably 1.40 g/cm$^3$ or less. Setting the heat fixation temperature during film formation to 180 to 240° C. facilitates crystallization and thus effectively increases the density.

The polyester film has an intrinsic viscosity of preferably 0.50 to 1.0 dl/g. An intrinsic viscosity of 0.50 dl/g or more is preferable because such an intrinsic viscosity increases the shock resistance of the film, and thus makes it unlikely for the internal circuitry of a display to become disconnected by an external shock. An intrinsic viscosity of 1.00 dl/g or less is preferable because it prevents filtration pressure of the molten fluid from becoming too high, thus stabilizing film production.

Easy-to-Adhere Layer

In the present invention, it is also preferable to laminate an easy-to-adhere layer on the polyester film in order to improve the adhesiveness between the polyester film and the hard coating layer or other layers. The easy-to-adhere layer can be obtained by applying a coating solution for forming an easy-to-adhere layer to one or both surfaces of an unstretched or longitudinal, uniaxially oriented film, optionally performing heat treatment to dry the applied coating, and drawing the film in at least one direction in which the film is not stretched. Heat treatment can also be performed after biaxial drawing is performed. It is preferable to control the final amount of the applied easy-to-adhere layer to 0.005 to 0.20 g/m$^2$. An amount of the applied easy-to-adhere layer of 0.005 g/m$^2$ or more is preferable because it provides adhesiveness. An amount of the applied easy-to-adhere layer of 0.20 g/m$^2$ or less is preferable because it provides blocking resistance.

Examples of resins to be contained in the coating solution for use in laminating an easy-to-adhere layer include polyester-based resins, polyether-polyurethane-based resins, polyester polyurethane resins, polycarbonate polyurethane resins, and acrylic resin; these resins can be used without any particular limitation. Examples of crosslinking agents to be contained in the coating solution for forming an easy-to-adhere-layer include melamine compounds, isocyanate compounds, oxazoline compounds, epoxy compounds, and carbodiimide compounds. These crosslinking agents can also be used in a combination of two or more. Due to the nature of in-line coating, these are preferably applied in the form of an aqueous coating solution, and the resins and the crosslinking agents are preferably water-soluble or water-dispersible resins or compounds.

To impart smoothness to the easy-to-adhere layer, it is preferable to add particles. The fine particles preferably have a mean particle size of 2 μm or less. Particles having a mean particle size of more than 2 μm are more likely to come off from the easy-to-adhere layer. Examples of particles to be contained in the easy-to-adhere layer include inorganic particles, such as titanium oxide, barium sulfate, calcium carbonate, calcium sulfate, silica, alumina, talc, kaolin, clay, calcium phosphate, mica, hectorite, zirconia, tungsten oxide, lithium fluoride, and calcium fluoride, and organic polymer particles, such as styrene-based particles, acrylic-based particles, melamine-based particles, benzoguanamine-based particles, and silicone-based particles. These may be singly added to the easy-to-adhere layer, or added in a combination of two or more types.

The method for applying the coating solution for use may be a known method as in the coating layer described above. Examples of methods for applying the coating solution include reverse roll coating, gravure coating, kiss coating, roll brush, spray coating, air-knife coating, wire-bar coating, and pipe doctor. These methods can be used singly or in combination.

Hard Coating Layer

When the polyester film according to the present invention is used as a surface protection film for a foldable display by positioning the polyester film on the surface of the display, the polyester film preferably has a hard coating layer on at least one surface of the film. The hard coating layer is preferably used in a display by positioning on the surface of the polyester film that is the front surface of the display. The resin for forming a hard coating layer can be any resin, without particular limitations, such as acrylic resins, siloxane resins, inorganic hybrid resins, urethane acrylate resins, polyester acrylate resins, and epoxy resins. These resins may also be used in a combination of two or more. The resin for use may contain particles such as inorganic filler or organic filler.

Film Thickness of Hard Coating Layer

The film thickness of the hard coating layer is preferably 1 to 50 μm. A film thickness of 1 μm or more is preferable because it ensures sufficient curing and leads to a high level of pencil hardness. A film thickness of 50 μm or less suppresses curling caused by hardening and contraction of the hard coating, thus increasing film handleability.

Coating Method

The method for forming a hard coating layer for use may be, for example, a Mayer bar, gravure coater, die coater, or knife coater. These methods can be used without any particular limitation and can be suitably selected according to viscosity and film thickness.

Curing Conditions

The method for curing the hard coating layer for use may be a method using energy beams such as UV light or electron beams, or a method using heat. From the standpoint of minimizing damage to the film, a method using energy beams such as UV light or electron beams is preferable.

Pencil Hardness

The pencil hardness of the hard coating layer is preferably 3H or higher, and more preferably 4H or higher. A pencil hardness of 3H or higher prevents the hard coating layer from being easily scratched, while not decreasing visibility. Although a higher level of pencil hardness of the hard coating layer is generally better, the pencil hardness may be 9H or lower, or 8H or lower; even a hard coating layer with a pencil hardness of 6H or lower is usable in practice without problems.

Properties of Hard Coating Layer

The hard coating layer in the present invention can be used for the purpose of protecting a display by increasing the pencil hardness of the surface as described above, and preferably has high transmittance. The hard coating film has a light transmittance of preferably 87% or more, and more preferably 88% or more. A transmittance of 87% or more ensures sufficient visibility. In general, a higher total light transmittance of the hard coating film is preferable. However, from the standpoint of stable production, the total light transmittance of the hard coating film is preferably 99% or less, and may be 97% or less. In general, the hard coating film preferably has a lower haze, and preferably a haze of 3% or less. The hard coating film has a haze of more preferably 2% or less, and most preferably 1% or less. A haze of 3% or less can improve the visibility of images. Although a lower haze is generally better, the haze of the hard coating film is preferably 0.1% or more, or may be 0.3% or more, from the standpoint of stable production.

The hard coating layer may have further functions added. For example, a hard coating layer with additional functionality, such as an anti-glare layer, anti-glare anti-reflective layer, anti-reflective layer, low-reflection layer, or antistatic layer having the predetermined pencil hardness above, can also be preferably used in the present invention.

The polyester film used as a substrate film of a touchscreen module may also be provided with a hard coating layer. For example, when an ITO layer is used as a transparent electrode layer of a touchscreen module, a refractive index adjustment layer is preferably provided between the substrate film and the transparent electrode layer to make the electrode pattern less visible. In this case, the hard coating layer itself may serve as a refractive index adjustment layer, or a separate refractive index adjustment layer may be laminated.

EXAMPLES

The following describes the present invention with reference to Examples and Comparative Examples. First, the methods for evaluating characteristic values used in the present invention are described below.

(1) Intrinsic Viscosity

A film or polyester resin was crushed, dried, and dissolved in a mixed solvent of phenol and tetrachloroethane in a ratio of phenol to tetrachloroethane of 60/40 (mass ratio). This solution was then centrifuged to remove inorganic particles. The flow time of the solution with a concentration of 0.4 (g/dl) and the flow time of the solvent alone were measured with an Ubbelohde viscometer at 30° C. From the time ratio, the intrinsic viscosity was calculated by using the Huggins equation with the assumption of Huggins's constant being 0.38.

(2) Refractive Index

In accordance with JIS K 7142:2008 (Plastic: Determination of Refractive Index (method A)), the refractive index in the longitudinal direction, the refractive index in the width direction, and the refractive index in the thickness direction were determined with an Abbe refractometer (NAR-4T, produced by Atago Co., Ltd., measurement wavelength: 589 nm).

(3) Pencil Hardness

Using hard coating films as samples, pencil hardness was measured under a load of 750 g at a rate of 1.0 mm/s in accordance with JIS K 5600-5-4:1999. In the present invention, a pencil hardness of 3H or more was rated as passing.

(4) Total Light Transmittance and Haze

Total light transmittance and haze were measured with a NDH5000 haze meter (produced by Nippon Denshoku Industries Co., Ltd.).

(5) Density

Density was measured in accordance with the method described in JIS K 7112:1999 (density-gradient tube method) (unit: g/cm$^3$).

(6) Maximum Heat Shrinkage

A sample film was cut to a size of 10 mm (length)×250 mm (width), and a long side was aligned with the direction to be measured and marked at intervals of 200 mm. Distance A, which is between the marks, was measured under a constant tension of 5 g. Subsequently, the sample film was allowed to stand in atmosphere at 150° C. in an oven for 30 minutes without a load, and then removed from the oven, followed by cooling to room temperature. Thereafter, distance B, which is between the marks, was measured under constant tension of 5 g, and the heat shrinkage (%) was determined by using the following formula. The heat shrinkage was measured at three evenly separated points in the width direction of the sample film, and the average of the values at the three points was taken as the heat shrinkage (%).

$$\text{Heat shrinkage (\%)} = [(A-B) \times 100]/A$$

The sample film was cut so that the vertical and horizontal directions were different for both the bending direction and the folding direction, and measurement was performed. The data of the direction larger in measurement value was taken as the maximum heat shrinkage (%).

(7) Hold Angle

The depth of a crease formed after fixing the film in such a manner that a strain of 1.7% is applied to each of both surfaces of a bent portion of the film is evaluated.

Figure 3:
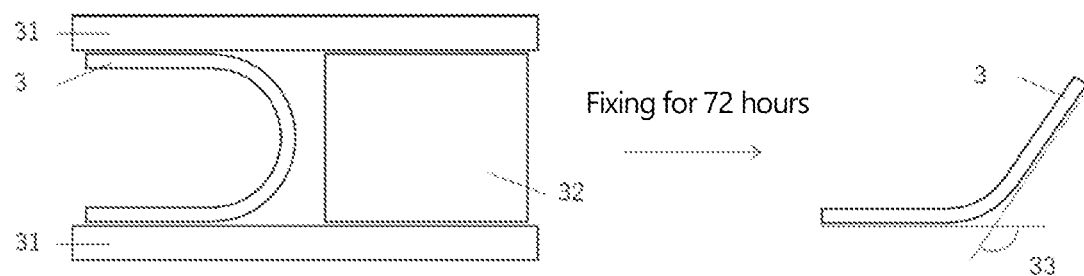
FIG. 3 is a schematic diagram to show a method for measuring the hold angle in the bending direction according to the present invention.

FIG. 3 is a schematic diagram to show a method for measuring the hold angle in the bending direction. A sample film (reference numeral 3) was cut to a size of 10 mm in the width direction and 50 mm in the flow direction. Two PTFE plates (reference numeral 31) were stacked one on the other. When a 50-μm sample film was used, a PTFE plate with a thickness of 3 mm (reference numeral: 32) is inserted as a spacer between the two PTFE plates to form a space between them. Double-sided tape was applied to both ends of the sample. The sample in a bent state was inserted into the space of 3 mm between the PTFE plates, and both ends of the sample were fixed to the PTFE plates with the double-sided tape. After the sample film in this state was placed in a 20° C./65% RH environment for 72 hours, the film was removed from the space between the two PTL plates (reference numeral 32). Five minutes after the removal, the angle of the crease formed on the film (reference numeral 33) was measured. This angle is defined as the hold angle.

Figure 4:
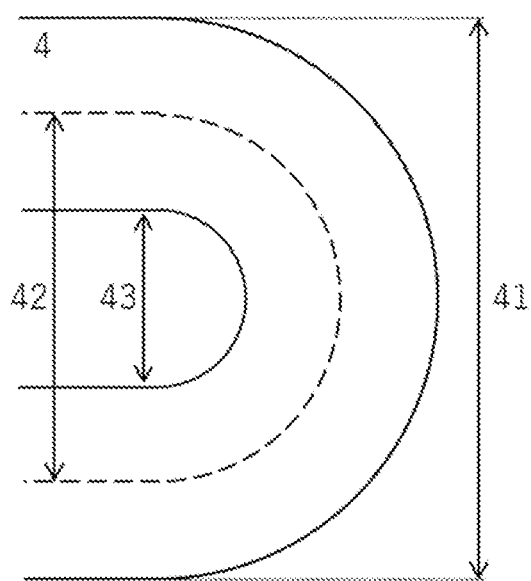
FIG. 4 is a schematic diagram of the bent portion of a sample film to illustrate a method for calculating the thickness of a spacer used when the hold angle in the bending direction according to the present invention is measured.

To keep the strain constant, the thickness of the PTFE plate used as a spacer is changed depending on the thickness of the film. FIG. 4 is an enlarged schematic diagram of a sample film (reference numeral 4) sandwiched between two PTFE plates (reference numeral 32). A neutral plane to which neither compressive stress nor tensile stress is applied is defined as the center in the thickness direction, and the difference between the neutral plane and both surfaces is defined as strain. In other words, the strain applied to both surfaces can be expressed by the following formula.

Strain (1.7%)=[(Semi-circumference of the outermost surface or inner surface−Semi-circumference of the neutral plane)/Semi-circumference of the neutral plane]×100

The semi-circumferences can be calculated according to the following formulas when the thickness of a sample film is defined as t (mm) and the bend diameter (diameter of the outermost surface), i.e., the thickness of the spacer used, is defined as d (mm).

Semi-circumference of the outermost surface=$d \times \pi/2$

Semi-circumference of the neutral face=$(d−t) \times \pi/2$

Semi-circumference of the innermost surface=$(d−2t) \times \pi/2$

From the above, when the strain is set to 1.7%, the thickness is defined as t (mm), and the bend diameter, i.e., the thickness of the spacer used, is defined as d (mm), the thickness of the PTFE plate for use as a spacer is determined according to the following formula. Table 1 shows the spacer thickness relative to typical film thickness.

Spacer thickness d (mm)=film thickness (mm)×60

When the sample film has a thickness of 50 μm, the diameter of the outermost circle (reference numeral 41) is the same as the thickness d of the spacer, which is 3 mm. The diameter of the innermost surface (reference numeral 43) is 2.9 mm, and the diameter of the neutral plane (reference numeral 42) is 2.95 mm.

TABLE 1

| Sample film thickness t (μm) | Bend diameter d (mm) |
| --- | --- |
| 38 | 2.3 |
| 50 | 3.0 |
| 75 | 4.5 |
| 100 | 6.0 |

Preparation of Polyethylene Terephtalate Pellet (a)

The esterification reactor for use was a continuous esterification reactor composed of a three-stage complete mixing tank equipped with a stirrer, a partial condenser, a feedstock inlet, and a product outlet. Slurry of TPA in an amount of 2 tons/hr, 2 mol of EG per mol of TPA, and antimony trioxide in an amount of 160 ppm on an Sb atom basis relative to a produced PET was continuously supplied to the first esterification reaction vessel of the esterification reactor, and allowed to react at 255° C. under ordinary pressure with an average residence time of 4 hours. Subsequently, the reaction product in the first esterification reaction vessel was continuously taken out of the system and supplied to the second esterification reaction vessel. EG distilled from the first esterification reaction vessel in an amount of 8 mass % of the produced polymer (produced PET) was then supplied to the second esterification reaction vessel, and an EG solution containing magnesium acetate in an amount of 65 ppm on a Mg atom basis relative to the produced PET, and an EG solution containing TMPA in an amount of 20 ppm on a P atom basis relative to the produced PET, were further added thereto, followed by a reaction at 260° C. under ordinary pressure with an average residence time of 1.5 hours. Subsequently, the reaction product in the second esterification reaction vessel was continuously taken out of the system and supplied to the third esterification reaction vessel, and an EG solution containing TMPA in an amount of 20 ppm on a P atom basis relative to the produced PET was further added thereto, followed by a reaction at 260° C. under ordinary pressure with an average residence time of 0.5 hours. The esterified reaction product generated in the third esterification reaction vessel was continuously supplied to a three-stage continuous polycondensation reactor to perform polycondensation, and filtered through a sintered stainless-steel filter material (nominal filtration accuracy: 5-μm particles are 90% cut), thereby obtaining polyethylene terephthalate pellet (a) with an intrinsic viscosity of 0.62 dl/g.

Preparation of Polyethylene Terephthalate Pellet (b)

Polyethylene terephthalate pellet (b) was obtained in the same manner as above by adjusting the intrinsic viscosity to 0.580 dl/g, except that the residence time of the third esterification reaction was adjusted in the production step of polyethylene terephthalate pellet (a).

Preparation of Polyethylene Terephthalate Pellet (c)

Polyethylene terephthalate pellet (c) with an intrinsic viscosity of 0.75 dl/g was obtained by subjecting polyethylene terephthalate pellet (a) to solid-state polymerization at 220° C. under a reduced pressure of 0.5 mmHg for a different period of time with a rotary vacuum polymerizes.

Polymerization of Urethane Resin 72.96 parts by mass of 1,3-bis(methylisocyanate) cyclohexane, 12.60 parts by mass of dimethylol propionic acid, 11.74 parts by mass of neopentyl glycol, 112.70 parts by mass of polycarbonate diol with a number average molecular weight of 2000, and as solvents, 85.00 parts by mass of acetonitrile and 5.00 parts by mass of N-methylpyrrolidone, were placed in a four-necked flask equipped with a stirrer, a Dimroth condenser, a nitrogen-feeding tube, a silica-gel-drying tube, and a thermometer, and stirred in a nitrogen atmosphere at 75° C. for 3 hours; the reaction mixture was confirmed to have reached a predetermined amine equivalent. Subsequently, after this reaction mixture was cooled to 40° C., 9.03 parts by mass of triethyl amine was added, thereby obtaining a polyurethane prepolymer D solution. Subsequently, 450 g of water was added to a reactor equipped with a homogenizing disperser capable of high-speed stirring, and the temperature was adjusted to 25° C., followed by dispersing an isocyanate-terminated prepolymer in water with stirring at 2000 min-1. Thereafter, some acetonitrile and water were removed under reduced pressure, thereby preparing water-soluble polyurethane resin (a) with a solids content of 35 mass %.

Polymerization of Water-Soluble Carbodiimide Compound 200 parts by mass of isophorone diisocyanate and 4 parts by mass of 3-methyl-1-phenyl-2-phosphorene-1-oxide (carbodiimidized catalyst) were added to a flask equipped with a thermometer, a nitrogen-gas-feeding tube, a reflux condenser, a dropping funnel, and a stirrer, and stirred in a nitrogen atmosphere at 180° C. for 10 hours, thereby obtaining an isocyanate-terminated isophorone carbodiimide (degree of polymerization: 5). Subsequently, 111.2 g of the obtained carbodiimide and 80 g of polyethylene glycol monomethyl ether (molecular weight: 400) were reacted at 100° C. for 24 hours. Water was gradually added thereto at 50° C., thereby obtaining transparent yellowish water-soluble carbodiimide compound (B) with a solids content of 40 mass %.

Preparation of Coating Solution for Forming Easy-to-Adhere-Layer

The following coating materials were mixed, thereby preparing a coating solution.
- Water: 16.97 parts by mass
- Isopropanol: 21.96 parts by mass
- Polyurethane resin (a): 3.27 parts by mass
- Water-soluble carbodiimide compound (B): 1.22 parts by mass
- Particles: 0.51 parts by mass
  (silica sol with a mean particle size of 40 nm, solids concentration: 40 mass %)
- Surfactant: 0.05 parts by mass
  (silicone-based surfactant, solids concentration: 100 mass %)

Preparation of Hard Coating Solution a 0.1 parts by weight of a leveling agent (produced by BYK-Chemie Japan, BYK307, concentration: 100%) were added to 100 parts by weight of a hard coating material (produced by JSR Corporation, OPSTAR® 27503, concentration: 75%), and the mixture was diluted with methyl ethyl ketone, thereby preparing a hard coating solution a with a solids concentration of 40 wt %.

Example 1

Polyethylene terephthalate pellet (a) was supplied to an extruder and melted at 285° C. This polymer was filtered through a sintered stainless-steel filter material (nominal filtration accuracy: 10-μm particles are 95% cut) and extruded from the outlet into a sheet form. The sheet-form polymer was then brought into contact with a casting drum (surface temperature: 30° C.) by using an electrostatic application casting method to solidify the polymer by cooling, thereby preparing an unstretched film. The unstretched film was uniformly heated to 75° C. by using heating rolls, and then heated to 85° C. using a non-contact heater, followed by roll drawing (drawing in the longitudinal direction) to a 1.4-fold film. Subsequently, the coating solution for forming an easy-to-adhere layer was applied to both surfaces of the obtained uniaxially stretched film by roll coating, and then dried at 80° C. for 20 seconds. Adjustment was made so that the amount of the applied coating solution for forming an easy-to-adhere layer was 0.06 g/m$^2$ after final drying (after being biaxially drawn). Thereafter, the film was guided to a tenter, preheated at 105° C., and laterally stretched 4.4-fold at 95° C. With the width fixed, the film was subjected to heat fixation at 220° C. for 5 seconds, and further relaxed by 4% in the width direction at 180° C., thereby obtaining a polyethylene terephthalate film roll with a thickness of 50 μm. The polyethylene terephthalate film roll was then subjected to off-line annealing treatment at 180° C. for 30 seconds to obtain a polyester film. Table 2 shows the evaluation results.

Example 2

A film roll obtained in the same manner as in Example 1 was subjected to aging treatment at 60° C. for one week instead of being subjected to the off-line annealing treatment. A polyester film was thus obtained.

Example 3

A polyester film was obtained in the same manner as in Example 1, except that the drawing ratio in the longitudinal direction was changed to 2.7-fold and the drawing ratio in the width direction was changed to 4.0-fold.

Example 4

A polyester film was obtained in the same manner as in Example 2, except that the drawing ratio in the longitudinal direction was changed to 2.7-fold and the drawing ratio in the width direction was changed to 4.0-fold.

Example 5

A polyester film was obtained in the same manner as in Example 1, except that the drawing ratio in the longitudinal direction was changed to 3.4-fold, the drawing ratio in the width direction was changed to 4.0-fold, the heat fixing temperature was changed to 230° C., and the annealing time was changed to 10 seconds.

Example 6

A polyester film was obtained in the same manner as in Example 1, except that the drawing ratio in the longitudinal direction was changed to 3.4-fold, the drawing ratio in the width direction was changed to 4.0-fold, and the heat fixing temperature was changed to 230° C.

Example 7

A polyester film was obtained in the same manner as in Example 2, except that the drawing ratio in the longitudinal direction was changed to 3.4-fold, the drawing ratio in the width direction was changed to 4.0-fold, the heat fixing temperature was changed to 230° C., and the aging time was changed to 5 days.

Example 8

A polyester film was obtained in the same manner as in Example 2, except that the drawing ratio in the longitudinal direction was changed to 3.4-fold, the drawing ratio in the width direction was changed to 4.0-fold, and the heat fixing temperature was changed to 230° C.

Example 9

A polyester film was obtained in the same manner as in Example 2, except that the drawing ratio in the longitudinal direction was changed to 3.4-fold, the drawing ratio in the width direction was changed to 4.0-fold, the heat fixing temperature was changed to 230° C., and the aging time was changed to 10 days.

Example 10

A polyester film was obtained in the same manner as in Example 1, except that the thickness was changed to 38 μm and the heat fixing temperature was changed to 190° C.

Example 11

A polyester film was obtained in the same manner as in Example 2, except that the thickness was changed to 38 μm and the heat fixing temperature was changed to 190° C.

Example 12

A polyester film was obtained in the same manner as in Example 1, except that the thickness was changed to 75 μm and the heat fixing temperature was changed to 190° C.

Example 13

A polyester film was obtained in the same manner as in Example 2, except that the thickness was changed to 75 μm and the heat fixing temperature was changed to 190° C.

Comparative Example 1

A film roll obtained in the same manner as in Example 1 was subjected to neither annealing nor aging treatment. An untreated polyester film was thus obtained.

Comparative Example 2

A film roll obtained in the same manner as in Examples 3 to 4 was subjected to neither annealing nor aging treatment. An untreated polyester film was thus obtained.

Comparative Example 3

A film roll obtained in the same manner as in Examples 5 to 9 was subjected to neither annealing nor aging treatment. An untreated polyester film was thus obtained.

Hard coating solution a was applied with a Meyer bar to one of the surfaces of each film thus obtained in an amount such that the thickness of the film after drying was 5 μm, and dried at 80° C. for 1 minute, followed by irradiating the film with UV light (integrated light intensity: 200 mJ/cm$^2$). Hard coating films were thus obtained.

TABLE 2A

| | PET pellet | | | PET film | | | |
|---|---|---|---|---|---|---|---|
| | | Intrinsic | Intrinsic | Draw ratio | | Draw temperature in the longitudinal | Drawing Preheating temperature in the width |
| | Kind | viscosity (dl/g) | viscosity (dl/g) | Longitudinal direction | Width direction | direction (° C.) | direction (° C.) |
| Example 1 | (a) | 0.62 | 0.58 | 1.4 | 4.4 | 85 | 105 |
| Example 2 | (a) | 0.62 | 0.58 | 1.4 | 4.4 | 85 | 105 |
| Example 3 | (a) | 0.62 | 0.58 | 2.7 | 4.0 | 85 | 105 |
| Example 4 | (a) | 0.62 | 0.58 | 2.7 | 4.0 | 85 | 105 |
| Example 5 | (a) | 0.62 | 0.58 | 3.4 | 4.0 | 85 | 105 |
| Example 6 | (a) | 0.62 | 0.58 | 3.4 | 4.0 | 85 | 105 |
| Example 7 | (a) | 0.62 | 0.58 | 3.4 | 4.0 | 85 | 105 |
| Example 8 | (a) | 0.62 | 0.58 | 3.4 | 4.0 | 85 | 105 |
| Example 9 | (a) | 0.62 | 0.58 | 3.4 | 4.0 | 85 | 105 |
| Example 10 | (a) | 0.62 | 0.58 | 1.4 | 4.4 | 85 | 105 |
| Example 11 | (a) | 0.62 | 0.58 | 1.4 | 4.4 | 85 | 105 |
| Example 12 | (a) | 0.62 | 0.58 | 1.4 | 4.4 | 85 | 105 |
| Example 13 | (a) | 0.62 | 0.58 | 1.4 | 4.4 | 85 | 105 |
| Comp. Ex. 1 | (a) | 0.62 | 0.58 | 1.4 | 4.4 | 85 | 105 |
| Comp. Ex. 2 | (a) | 0.62 | 0.58 | 2.7 | 4.0 | 85 | 105 |
| Comp. Ex. 3 | (a) | 0.62 | 0.58 | 3.4 | 4.0 | 85 | 105 |

| | PET film | | | | | |
|---|---|---|---|---|---|---|
| | Heat fixation | | Relaxation | Annealing | | Aging | |
| | temperature (° C.) | Relaxation direction | rate (%) | Time (sec) | Temperature (° C.) | Time (hr) | Temperature (° C.) |
| Example 1 | 220 | Width direction | 4 | 30 | 180 | — | — |
| Example 2 | 220 | Width direction | 4 | — | — | 168 | 60 |
| Example 3 | 220 | Width direction | 4 | 30 | 180 | — | — |
| Example 4 | 220 | Width direction | 4 | — | — | 168 | 60 |
| Example 5 | 230 | Width direction | 4 | 10 | 180 | — | — |
| Example 6 | 230 | Width direction | 4 | 30 | 180 | — | — |

TABLE 2A-continued

| | | | | | | | |
|---|---|---|---|---|---|---|---|
| Example 7 | 230 | Width direction | 4 | — | — | 120 | 60 |
| Example 8 | 230 | Width direction | 4 | — | — | 168 | 60 |
| Example 9 | 230 | Width direction | 4 | — | — | 240 | 60 |
| Example 10 | 190 | Width direction | 4 | 30 | 180 | — | — |
| Example 11 | 190 | Width direction | 4 | — | — | 168 | 60 |
| Example 12 | 190 | Width direction | 4 | 30 | 180 | — | — |
| Example 13 | 190 | Width direction | 4 | — | — | 168 | 60 |
| Comp. Ex. 1 | 220 | Width direction | 4 | — | — | — | — |
| Comp. Ex. 2 | 220 | Width direction | 4 | — | — | — | — |
| Comp. Ex. 3 | 230 | Width direction | 4 | — | — | — | — |

TABLE 2B

| | PET film | | | | |
|---|---|---|---|---|---|
| | | | Refractive index | | |
| | Thickness (μm) | Density (g/cm$^3$) | Longitudinal direction | Width direction | Thickness direction | Bending direction |
| Example 1 | 50 | 1.385 | 1.604 | 1.693 | 1.505 | Longitudinal direction |
| Example 2 | 50 | 1.384 | 1.604 | 1.695 | 1.500 | Longitudinal direction |
| Example 3 | 50 | 1.399 | 1.628 | 1.685 | 1.505 | Longitudinal direction |
| Example 4 | 50 | 1.398 | 1.625 | 1.687 | 1.500 | Longitudinal direction |
| Example 5 | 50 | 1.398 | 1.640 | 1.670 | 1.498 | Longitudinal direction |
| Example 6 | 50 | 1.399 | 1.638 | 1.670 | 1.500 | Longitudinal direction |
| Example 7 | 50 | 1.396 | 1.635 | 1.667 | 1.497 | Longitudinal direction |
| Example 8 | 50 | 1.397 | 1.630 | 1.667 | 1.498 | Longitudinal direction |
| Example 9 | 50 | 1.397 | 1.630 | 1.668 | 1.498 | Longitudinal direction |
| Example 10 | 38 | 1.388 | 1.603 | 1.692 | 1.503 | Longitudinal direction |
| Example 11 | 38 | 1.390 | 1.603 | 1.690 | 1.503 | Longitudinal direction |
| Example 12 | 75 | 1.383 | 1.607 | 1.693 | 1.508 | Longitudinal direction |
| Example 13 | 75 | 1.389 | 1.610 | 1.690 | 1.505 | Longitudinal direction |
| Comparative Example 1 | 50 | 1.383 | 1.592 | 1.69 | 1.517 | Longitudinal direction |
| Comparative Example 2 | 50 | 1.398 | 1.631 | 1.686 | 1.500 | Longitudinal direction |
| Comparative Example 3 | 50 | 1.396 | 1.650 | 1.669 | 1.496 | Longitudinal direction |

| | PET film | | | | |
|---|---|---|---|---|---|
| | Spacer thickness (mm) | Hold angle in the bending direction (°) | Total light transmittance (%) | Haze (%) | Maximum heat shrinkage (%) | Hard coating film Pencil hardness |
| Example 1 | 3.0 | 160 | 91 | 0.8 | 0.1 | 3H |
| Example 2 | 3.0 | 164 | 91 | 0.8 | 1.5 | 3H |
| Example 3 | 3.0 | 158 | 91 | 0.8 | 0.1 | 3H |
| Example 4 | 3.0 | 163 | 91 | 0.8 | 1.3 | 3H |
| Example 5 | 3.0 | 155 | 91 | 0.8 | 0.3 | 3H |
| Example 6 | 3.0 | 156 | 91 | 0.8 | 0.1 | 3H |

TABLE 2B-continued

| | | | | | | |
|---|---|---|---|---|---|---|
| Example 7 | 3.0 | 156 | 91 | 0.8 | 0.7 | 3H |
| Example 8 | 3.0 | 160 | 91 | 0.8 | 0.8 | 3H |
| Example 9 | 3.0 | 161 | 91 | 0.8 | 0.8 | 3H |
| Example 10 | 2.3 | 160 | 91 | 0.8 | 0.1 | 3H |
| Example 11 | 2.3 | 165 | 91 | 0.8 | 1.2 | 3H |
| Example 12 | 4.5 | 159 | 91 | 0.8 | 0.2 | 3H |
| Example 13 | 4.5 | 163 | 91 | 0.8 | 1.4 | 3H |
| Comparative Example 1 | 3.0 | 158 | 91 | 0.8 | 1.7 | 3H |
| Comparative Example 2 | 3.0 | 153 | 91 | 0.8 | 1.5 | 3H |
| Comparative Example 3 | 3.0 | 151 | 91 | 0.8 | 1.0 | 3H |

The hard coating films were each laminated on an organic EL module via a 25-μm-thick adhesive layer, thereby preparing foldable smartphone-type displays that can be folded in half at their center, with a radius of 3 mm, which corresponds to the bend radius in FIG. 1. The hard coating film was provided on the front surface of the single continuous display via the folding portion so that the hard coating layer was positioned as the front surface of the display. The displays prepared using the hard coating films of the Examples were satisfactory in terms of operation and visibility as a portable smartphone that is foldable in half at their center. The surface of these displays was also not dented by external forces. On the other hand, the foldable displays prepared by using the hard coating films of the Comparative Examples were not so desirable because they appeared to develop image distortion at the folding portion of the display as the frequency of use increased. Additionally, some had dents and scratches on the surface.

INDUSTRIAL APPLICABILITY

While maintaining its suitability in mass production, a foldable display using the polyester film or the hard coating film for foldable displays according to the present invention is unlikely to deform after the polyester film or the hard coating film positioned on the front surface of the foldable display is repeatedly folded, thus not causing image distortion at the folding portion of the display. In particular, a mobile device or image display device equipped with a foldable display using the polyester film or hard coating film according to the present invention as a surface protection film provides beautiful images and has a variety of functionality, while being highly convenient such as in portability.

DESCRIPTION OF THE REFERENCE NUMERALS

1: foldable display
11: bend radius
2: polyester film for surface protection films of foldable displays
21: folding portion
22: bending direction (the direction orthogonal to the folding portion)
3: sample film
31: PTFE plate
32: spacer (PTFE plate)
33: hold angle
4: sample film
41: diameter of the outermost surface
42: diameter of the neutral plane
43: diameter of the innermost surface

The invention claimed is:

1. A polyethylene terephthalate film for a foldable display, the film having an intrinsic viscosity of 0.50 to 1.0 dl/g, a density of 1.380 g/cm$^3$ or more, a hold angle in a bending direction of 155° or more, and a maximum heat shrinkage at 150° C. of 1.5% or less, wherein the hold angle refers to an angle of a crease formed after fixing the film at room temperature for 72 hours in such a manner that a strain of 1.7% is applied to both surfaces of a bent portion of the film, and the bending direction refers to a direction that is orthogonal to a folding portion of a foldable display produced using the film.

2. The polyethylene terephthalate film for a foldable display according to claim 1, having a total light transmittance of 85% or more and a haze of 3% or less.

3. The polyethylene terephthalate film for a foldable display according to claim 2, comprising an easy-to-adhere layer on at least one surface of the polyethylene terephthalate film.

4. A hard coating film for a foldable display, comprising the polyethylene terephthalate film for a foldable display of claim 3, and a hard coating layer having a thickness of 1 to 50 μm on at least one surface of the polyethylene terephthalate film.

5. A foldable display comprising the hard coating film for a foldable display of claim 4, wherein
the hard coating film is disposed as a surface protection film such that the hard coating layer becomes the front surface, and
the hard coating film is a single continuous film placed through the folding portion of the foldable display.

6. A mobile device comprising the foldable display of claim 5.

7. The polyethylene terephthalate film for a foldable display according to claim 1, comprising an easy-to-adhere layer on at least one surface of the polyethylene terephthalate film.

8. A hard coating film for a foldable display, comprising the polyethylene terephthalate film for a foldable display of claim 1, and a hard coating layer having a thickness of 1 to 50 μm on at least one surface of the polyethylene terephthalate film.

9. A foldable display comprising the hard coating film for a foldable display of claim 8, wherein
the hard coating film is disposed as a surface protection film such that the hard coating layer becomes the front surface, and
the hard coating film is a single continuous film placed through the folding portion of the foldable display.

10. A mobile device comprising the foldable display of claim 9.

* * * * *